United States Patent [19]
Ito et al.

[11] Patent Number: 5,351,581
[45] Date of Patent: Oct. 4, 1994

[54] EQUIPMENT AND A METHOD FOR DISPOSING A PEELED-OFF CHIP OF AN ELECTRIC CABLE

[75] Inventors: Noboru Ito; Nobuaki Yamakawa, both of Shizuoka, Japan

[73] Assignee: Yazaki Corporation, Tokyo, Japan

[21] Appl. No.: 725,725

[22] Filed: Jul. 3, 1991

[30] Foreign Application Priority Data

Jul. 9, 1990 [JP] Japan ................................. 2-179580

[51] Int. Cl.⁵ ............................................. H02G 1/12
[52] U.S. Cl. .................................................... 81/9.51
[58] Field of Search ...................... 81/9.51, 9.4, 9.41, 81/9.42; 51/319, 320, 272, 321

[56] References Cited

U.S. PATENT DOCUMENTS

| | | | |
|---|---|---|---|
| 1,730,980 | 10/1929 | Montgomery | 81/9.42 |
| 3,588,984 | 8/1969 | Van de Kerkhof . | |
| 4,350,061 | 9/1982 | Isham et al. | 81/9.51 |
| 4,352,305 | 10/1982 | Rodenbeck | 81/9.51 |
| 4,535,576 | 8/1985 | Shukla et al. | 51/319 |
| 4,584,912 | 4/1986 | Gudmestad et al. | 81/9.51 |

FOREIGN PATENT DOCUMENTS

| | | |
|---|---|---|
| 3926782C1 | 12/1990 | Fed. Rep. of Germany . |
| 48-36635 | 11/1973 | Japan . |

OTHER PUBLICATIONS

German Journal "Industrie–Anzeiger" 100/1986 pp. 36–37, "Angereichterte Luft eliminiert Aufladungen", M. J. Bader.

*Primary Examiner*—D. S. Meislin
*Attorney, Agent, or Firm*—Nikaido, Marmelstein, Murray & Oram

[57] ABSTRACT

The present invention discloses a method for disposing a peeled-off chip of an electric cable, wherein a sheath of an electric cable is first cut by a pair of peeling blades in a state that one of the electric cable is firmly fixed, and then the peeling blades and/or said electric cable are moved in the axial direction of the electric cable so as to remove the peeled-off chip of the cable sheath, with a characteristic feature that the peeled-off chips which are attached to the pair of peeling blades after the cutting operation is completed are blown off by an ionized air. In order to realize the above-described method, the present invention is provided with an air ionizing means for ionizing the air to be blown against the peeled chips, which air ionizing means further comprising an electrification preventing means and an air ionizing nozzle which is connected to the electrification preventing means by way of a cable means.

5 Claims, 2 Drawing Sheets

EQUIPMENT AND A METHOD FOR DISPOSING A PEELED-OFF CHIP OF AN ELECTRIC CABLE

BACKGROUND OF THE INVENTION

1. Field of the Invention

The present invention relates to a method and equipment for disposing a cut sheath of an electric cable produced in a process of manufacturing wire-harnesses.

2. Description of the Prior Art

Conventionally, cable sheath peeling equipment for use with manufacturing wire-harnesses is disclosed, for example, in Japanese Patent Publication No. 48-36635, wherein a mechanism for continuously cutting, peeling and clamping the terminal of an electric cable is disclosed therein.

FIG. 2 shows a part of a terminal clamping device as described above, which is provided with a pair of removably disposed cutting blades 1, 1, cutter base 2, cutter frame 3, and a chip dropping plate 5 having an air blowing nozzle 4 thereon.

The peeling operation of the above described equipment is conducted as shown in FIG. 3 such that the cable sheath 6a is cut, with an end portion of an electric cable 6 being fixed by a clamping device (not shown), and then a pair of cutting blades 1, 1 are moved in the axial direction of the cable as a normal procedure, so that a cut sheath 7 is thereby produced.

In the cutting operation of the aforementioned conventional cutting equipment, the cut sheath 7 produced by the foregoing cutting operation is attached to the pair of blades 1, 1, whereby the attached cut sheath is entangled and involved in the next same cutting procedure. An incorrect cutting operation such as cutting too deep into the core of the cable is thereby caused. In order to avoid this phenomenon, compressed air of approximate pressure of 5 Kg/cm is blown against the cut sheath through an air blowing nozzle.

However, this cut sheath blowing method causes additional mechanical trouble due to the fact that each of the blown cut sheaths is scattered and therefore becomes attached to other surrounding equipment.

All of these phenomena are caused by static electricity, since the cable sheath is made of polyvinyl chloride or polyethylene which are inclined to be readily electrified in the conventional equipment. When the cable is drawn from a reel which is not shown, approximately 2 KV of static electricity is generated, or sometimes it is statically electrified due to the friction with other mechanical devices.

SUMMARY OF THE INVENTION

The present invention has been made to solve such subject as described above, and it is an object of the present invention to obtain a device and method for disposing cut sheaths of an electric cable produced in a process of manufacturing wire-harnesses, whereby the cut sheaths can be prevented from scattering and attaching to the peeling blades, and therefore the mechanical trouble can be avoided.

In order to attain the above mentioned subject, a method for disposing a cut sheath of an electric cable is characterized in that a sheath of an electric cable is first cut by a pair of cutting blades in a state that one end of the electric cable is firmly fixed, and then the cutting blades and/or the electric cable are moved in the axial direction of the cable so as to remove the cut sheath, and then the cut sheath attached to the pair of cutting blades is blown off by ionized air. And further, an apparatus for disposing a cut sheath of an electric cable according to the present invention comprises a pair of cutting blades for peeling a sheath of an electric cable; and air supplying means for blowing against the cut sheath which are attached to the pair of cutting blades, characterized in that the air supplying means is provided with an air ionizing means.

According to the present invention, ionized air is blown against the periphery of the cutting blades, whereby static electricity generated on the cutting blades and cut sheaths can be quickly blown off, and therefore, the cut sheaths are not attached to the cutting blades, and are thereby blown off to a predetermined place, so that the second problem due to the scattered peeled-off chips can also be prevented.

Furthermore, since the ionized air to be provided can be of a level as low as 1–1.5 Kg/cm$^2$, it can contribute to energy savings and noise reduction.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

Figure 1:
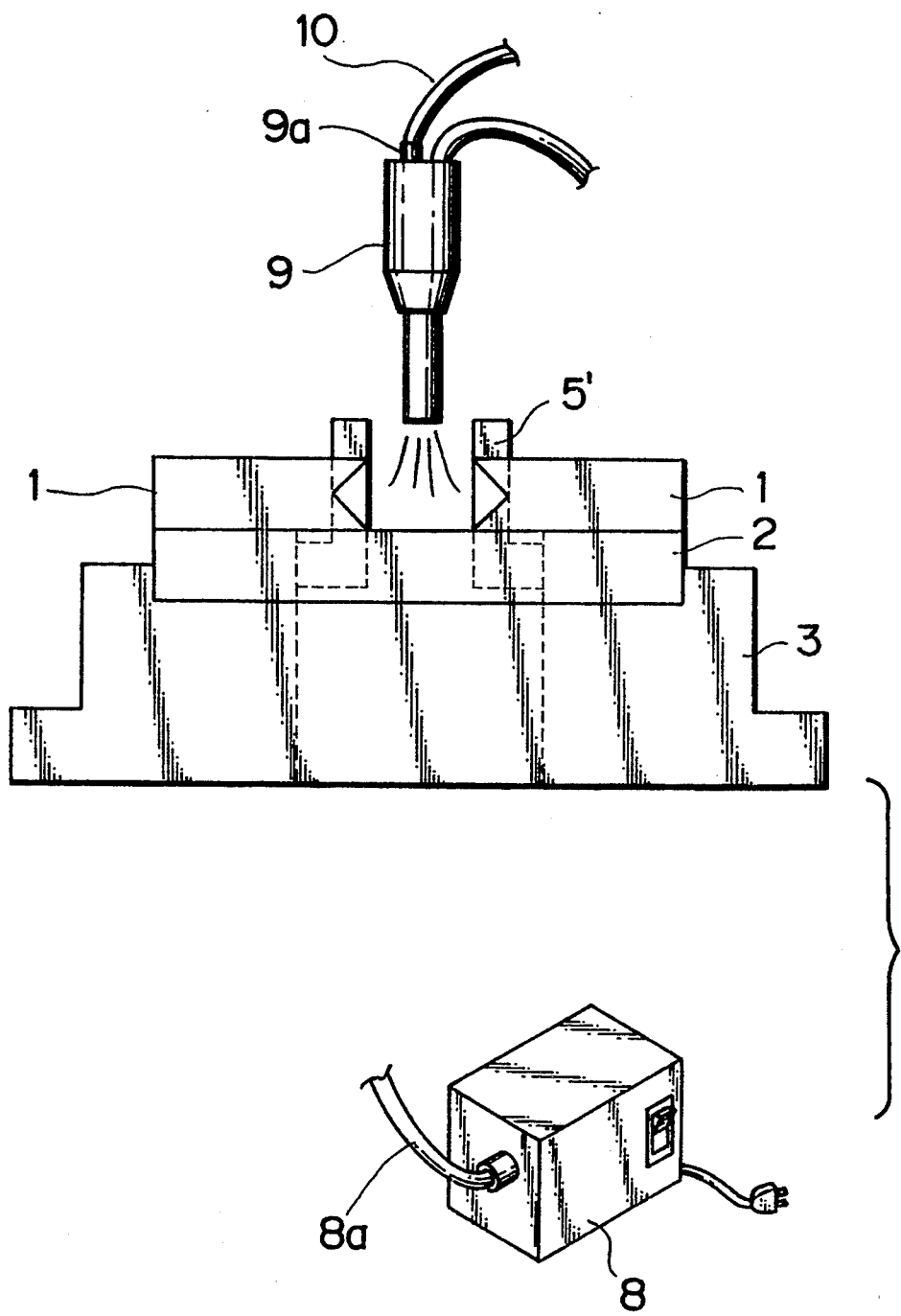
FIG. 1 is a rough sketch of an equipment for disposing a cut sheath of an electric cable according to one embodiment of the present invention.
Figure 2:
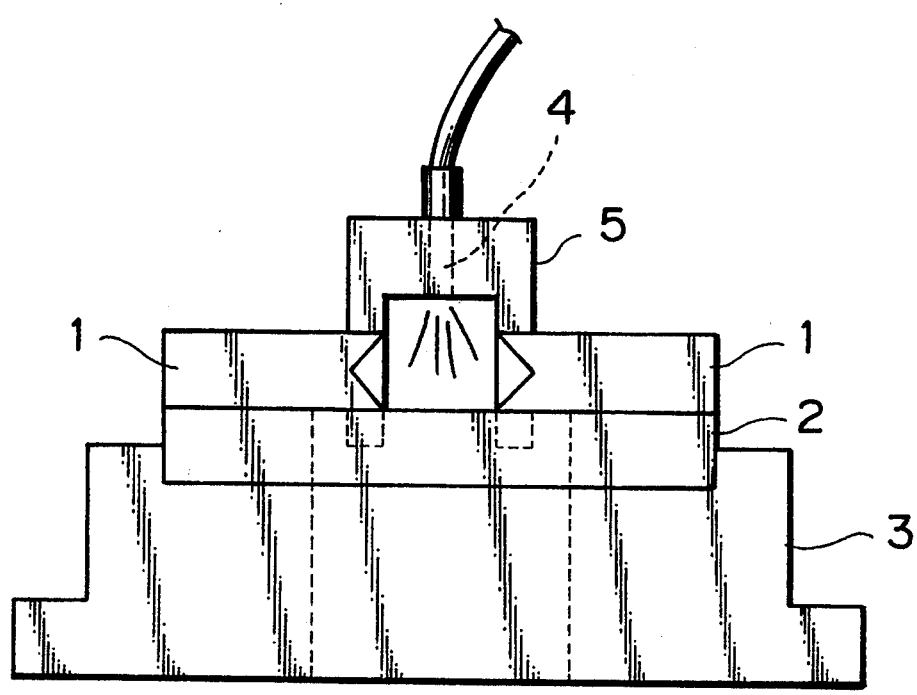
FIG. 2 is a rough sketch showing one portion of a conventional terminal clamping device.

Referring to FIG. 1, reference numeral 1 denotes a cutting blade, 2 a cutter base, 3 a cutter frame, and 5' a cut sheath dropping plate, and these reference characters denote like or corresponding portions of the conventional equipment.

Reference numeral 8 denotes an electrification preventing device provided with an ionizing nozzle 9 connected through a cord 8a, and a hose 10 is connected to a metal cap 9a of the ionizing nozzle 9 for sending compressed air thereto. Through the hose 10, compressed air of a low pressure level of 1.0–1.5 Kg/cm$^2$ is ionized here, and is blown against the periphery of the cutting blades 1, 1. The electrification preventing device 8 and the ionizing nozzle 9, which are form the ionizing device, can be preferably obtained from ordinary shops. Further, although explanation concerning the cutting operation and the stripping operation of the cable sheath are not given here because of its similarity with the above mentioned explanation, after the cutting operation is completed by the cutting blades, either the peeling blades or the electric cable can be shifted, or both of them can also be shifted simultaneously along with the axial direction of the electric cable, to complete the cutting and stripping operation.

Figure 3:
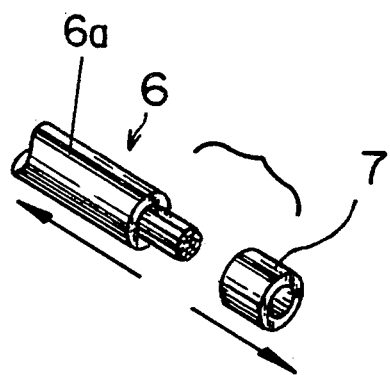
FIG. 3 is a perspective view showing a cut electric cable.

Static electricity generated on the pair of cutting blades 1, 1 and the cut sheath (refer to FIG. 3) is neutralized by the ionized air blown thereagainst, and the cut sheath directly drops without attaching to the blades 1 and 1.

Accordingly, compressed high-pressure air which is necessary for blowing the cut sheaths in a conventional apparatus can be obviated in an equipment for disposing a cut sheath of an electric cable according to the present invention, and therefore, scattering of the cut sheaths can also be avoided. Besides, since low-pressure air can be used for producing ionized air energy saving and noise reduction are also made possible.

As described so far, since the cut sheaths generated in an apparatus according to the present invention are not scattered and therefore not attached to the cutting blades, the mechanical trouble possibly caused by these phenomena can be prevented, so that energy saving and noise reduction are also made possible so as to contribute to the environmental improvement in due course.

Although the invention has been described in its preferred from with a certain degree of particularity, certain changes and variations are possible therein. It is therefore to be understood the invention may be practiced otherwise than as specifically described herein without departing from the spirit and scope thereof.

What is claimed is:

1. A method for stripping insulation form an electric cable and disposing of a cut insulation sheath of the electric cable, wherein an insulation sheath of an electric cable is first cut by a pair of cutting blades in a state that said electric cable is firmly fixed, and then said cutting blades and said electric cable are moved relative to each other in an axial direction of said electric cable so as to strip the cable and remove the cut sheath, and wherein said cut sheath attached to said pair of cutting blades is blown off by ionized air.

2. A device for stripping insulation from an electric cable, said device comprising:
cable stripping means comprising a pair of cutting blades, said cable stripping means for cutting a sheath of an electric cable;
disposal means for disposing of a cut sheath of an electric cable; said disposal means including
an air supplying means for blowing air against a cut sheath which is attached to said pair of cutting blades; and
an air ionizing means for ionizing the air supplied from said air supplying means.

3. A device for stripping insulation from an electric cable as defined in claim 2, wherein said air ionizing means further comprises an air ionizing device for ionizing the air from said air supplying means, and an air nozzle for directing the air toward the cutter blades, said air ionizing nozzle being connected to said air ionizing device by a cord, said air ionizing device and said air ionizing nozzle for eliminating electrification of the cut sheath.

4. A device for stripping insulation from an electric cable as defined in claim 2, further comprising means for shifting said cutting blades in the axial direction of said electric cable after cutting operation of said sheath is completed by said cutting blades.

5. A device for stripping insulation from an electric cable comprising:
cable stripping means having a pair of cutting blades for cutting a sheath of an electric cable;
disposal means for disposing of a cut sheath of an electric cable; said disposal means including
an air supplying means for blowing air against a cut sheath which is attached to said pair of cutting blades; and
an air ionizing means for ionizing the air supplied from said air supplying means, said air ionizing means further comprising:
an air ionization device for ionizing the air from said air supplying means, and for eliminating electrification of said cut sheath; and
an air ionizing nozzle which is connected to said air ionizing device by a cord.

* * * * *